March 26, 1929.  F. O. SNOW, JR  1,707,202
POWER DRIVEN SNOW REMOVING APPARATUS
Filed Feb. 4, 1927  2 Sheets-Sheet 2
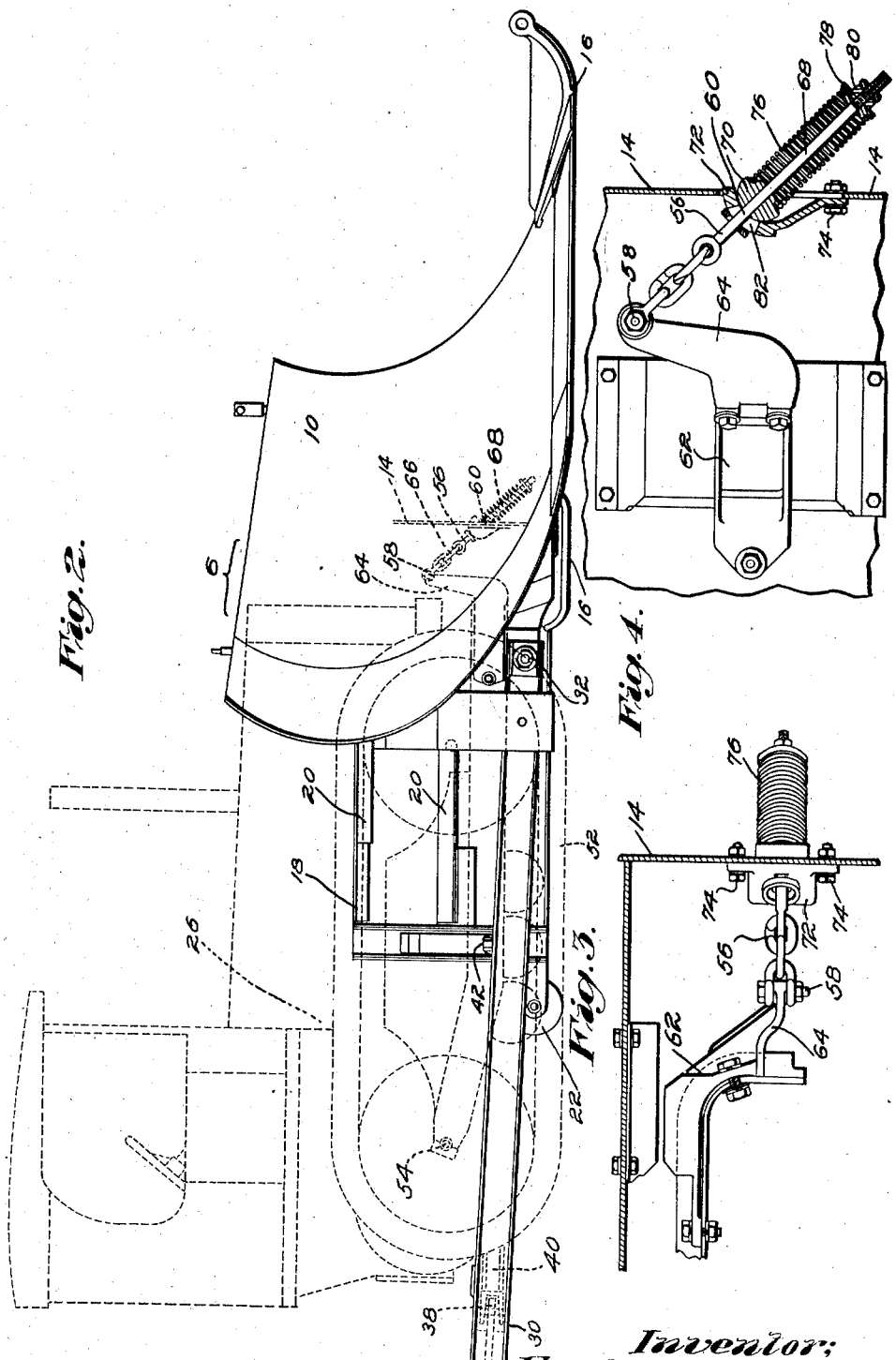

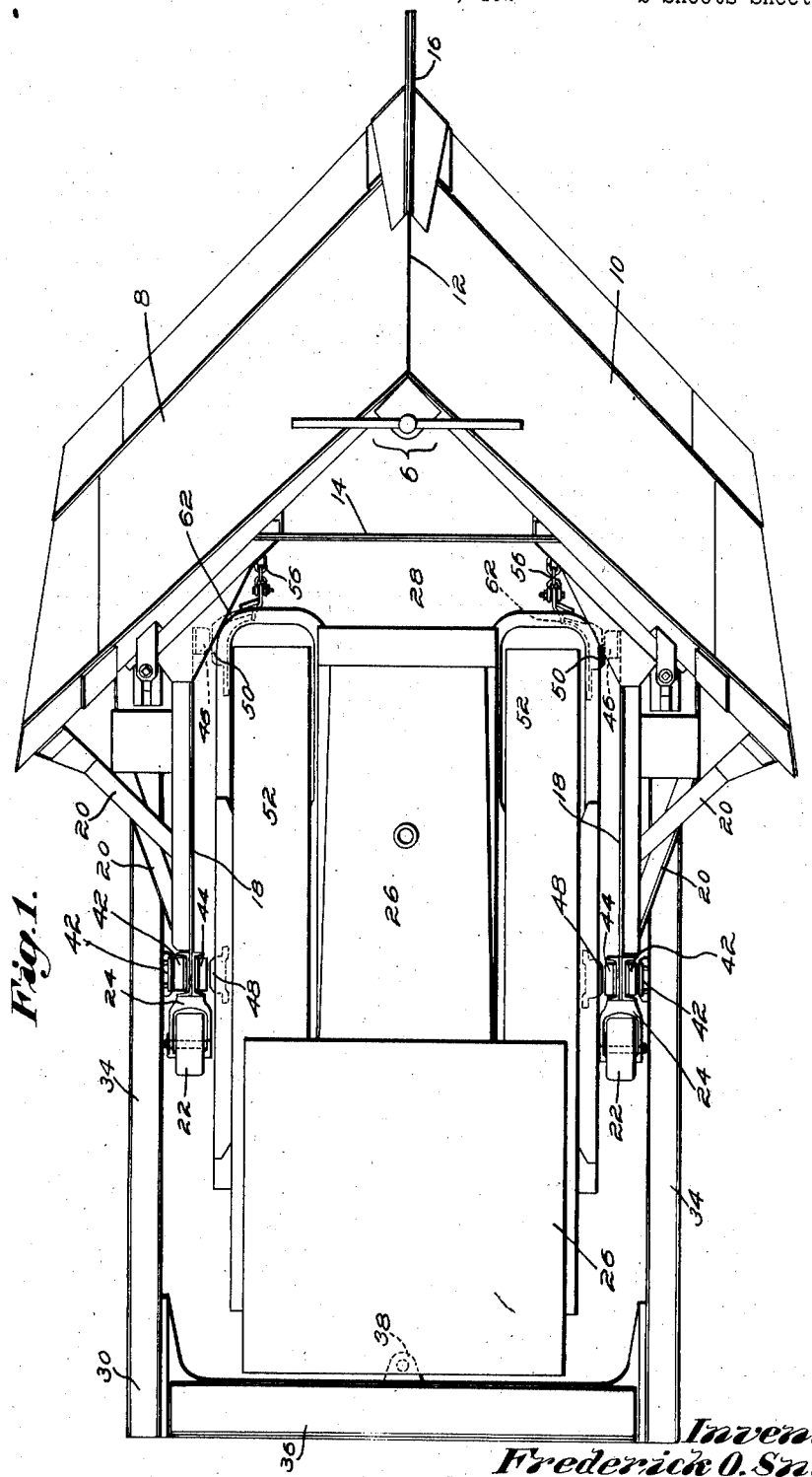

Patented Mar. 26, 1929.

1,707,202

UNITED STATES PATENT OFFICE.

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE.

POWER-DRIVEN SNOW-REMOVING APPARATUS.

Application filed February 4, 1927. Serial No. 165,937.

This invention aims to provide a powerful and effective power driven snow removing apparatus.

In the accompanyng drawings, wherein I have shown merely for illustrative purposes one complete embodiment of my invention, Fig. 1 is a plan view of a snow removing apparatus;

Fig. 2 is a side elevation of the same;

Fig. 3 is a detail plan section showing the connection between the plow and its propelling device; and Fig. 4 is a detail elevation partly in section of the connecting means illustrated in Fig. 3.

In the drawings the illustrative embodiment therein comprises a snow plow 6 comprising rearwardly diverging wings 8 and 10 connected together by a transverse vertically disposed partition 14.

The plow 6 is self-supporting, herein by means including runners 16 placed at or near the prow and at or near the outer ends of the said wings, although it is to be understood that the invention is not limited to the particular arrangement and number of bearing members shown.

To further increase the supporting of the plow and to render it more stable and less likely to nose up when heavy snows are encountered or to nose in when some obstruction is encountered beneath the snow, additional supporting members are provided, herein in the form of rearwardly extending upright members 18 spaced apart and reinforced by angular braces or struts 20 extending from near the rear outer ends of said members 18 to adjacent portions of the wings, said braces preventing lateral movements of said rearwardly extending supporting members.

To facilitate movements of the plow 6 the supporting members 18 are provided with bearing members, herein near their rear ends, consisting of rollers 22 each of which is mounted to rotate in a yoke 24 secured to said support 18 and adapted to hold said supports at the desired distance above the ground. It is however to be understood that the invention is not limited to the use of roller bearing members at these points. The rearwardly extending upright supporting members 18 are placed far enough apart to receive or permit the insertion of a propelling device such for example as a crawler tractor 26 which may be moved into the stall-like space 28 in said plow nearly to the partition 14.

A propulsion frame 30 of substantially U-shaped construction is connected with the plow, herein by pivots 32 located approximately abreast of the forward part of the tractor, said propulsion frame extending rearwardly with one of its legs 34 at each side of the plow just outside of the support 18. The rear ends of the legs 34 are connected together by a cross member 36 arranged across the rear of the tractor and carrying an eye 38 for pivotal or flexible connection with the draw bar 40 of the tractor, which draw bar extends rearwardly from a suitable point of connection with the tractor, and by reason of this connection either a forward or a rearward movement may be imparted by the tractor to the plow.

The supporting members 18 of the plow extend rearwardly to a point about midway of the tractor so as to provide a long base for the plow to prevent, as hereinbefore stated, the plow from tilting either forwardly or rearwardly while in operation, and by connecting the propulsion frame 30 with the plow by pivotal connections 32 located near the forward end of the tractor, or about midway of the plow, a much greater stability will be provided and the nosing in or out of the plow prevented when an obstruction is encountered or when the plow is passing over a crown or slight sharp elevation. Furthermore, the long base of the plow maintains the same level and a substantially even keel regardless of the amount of snow encountered.

To prevent lateral deflection of the propulsion frame relatively to the plow when a turn is being made, I provide abutments 42, herein in the form of wearing plates, secured respectively on adjacent portions of the legs 34 and the rear ends of the supporting members 18, said abutments being elongated sufficiently to provide for any vertical swinging movements of said propulsion frame.

To still further support the members 18 against lateral deflection I provide abutments 44 and 46 arranged respectively near the rear and forward ends of said supporting members but upon the inner faces thereof to engage corresponding abutments 48 and 50 carried by the propelling device or tractor 26.

Although any appropriate propelling device may be employed, I have shown herein a device in the form of a crawler tractor comprising track-laying structures 52 arranged on opposite sides of the tractor frame and pivotally connected at 54 near the rear end of said tractor frame, these track structures being arranged to swing about said pivot in vertical planes relatively to each other to conform more readily to the surface of the ground over which the device is traveling.

In the present arrangement the plow 6 is much heavier than the track structures or at least the forward end of the tractor, consequently there may at times be a tendency of the tractor to move upwardly relatively to the plow and so reduce traction. To overcome this tendency connections are provided between the forward portions of the propelling device and the plow which tend to exert a yielding downward pressure upon the tractor, said means herein including a downwardly and forwardly inclined flexible link 56. By arranging the link 56 so as to incline downwardly and forwardly and connecting the same at one end 58 to the tractor and near the opposite end 60 to the plow, relative movement between the tractor and the plow will be permitted without effecting the interference of the parts of the connecting means or the parts connected thereby.

Any appropriate connecting means between the plow and the tractor may be provided, but herein said connecting means consist of two links, because of the nature of the tractor or propelling device employed, as for example the track-laying structures which have relative vertical movements, therefore it is desirable to provide a separate link between each of the track-laying structures and the plow. To this end I have provided an extension 62 which is secured to the forward end of the track structure and has a forwardly projecting arm 64 to which the link 56 is pivotally connected at 58. The extension 62 may and herein does include the abutment 50 which bears against the abutment 46 on the plow. The other or lower end of each link 56 is herein universally and resiliently connected to a portion of the partition 14, preferably directly in front of the extension 64 and at a point substantially lower than the pivot 58 of said link. To provide flexibility the upper portion of the link 56 is composed of a series of links 66 whereas the lower portion thereof consists of a rod 68 having slidable connection with a ball-shaped member 70 arranged to engage in a socket-like member 72 secured by a bolt 74 to the diaphragm or partition 14. A spring 76 encircles the lower end of the rod 68 bearing against the ball-shaped member 70 and at its other end against a collar 78 adjustably mounted on said rod 68 and held in the desired position by a nut 80 having screw-threaded engagement with said rod. By reason of this connection the tractor element to which the link is connected may move vertically or slightly laterally to produce swivel actions between the ball member 70 and the socket 72, the rod sliding through said ball member 70 and working in an elongated hole 82 in the socket member.

The spring 76 is normally set to exert only a slight tension upon the link to keep it taut should the tractor element to which the same is attached move downward relative to the partition 14, but should said tractor structure swing upwardly the weight of the plow, being greater than said track-laying structure, the force exerted by said spring will tend to resist said upward movement of the track structure and so prevent the same from riding too high upon the snow over which it is traveling.

It is to be understood that the invention is not limited to the specific embodiment herein shown.

Claims:

1. A snow removing apparatus comprising a self-supported plow including rearwardly extending spaced rigid supporting members, a propelling device arranged between said plow supporting members and a propulsion frame pivotally secured to the plow substantially abreast of the forward part of said propelling device and extending about and flexibly connected to the rear of said propelling device.

2. A snow removing apparatus comprising a self-supported plow including rearwardly extending spaced rigid supporting members having bearing members at their rear ends, a propelling device arranged between said plow supporting members and a propulsion frame pivotally secured to the plow substantially abreast of the forward part of said propelling device and extending about and flexibly connected to the rear of said propelling device.

3. A snow removing apparatus comprising a self-supported plow including rearwardly extending spaced rigid supporting members having bearing rollers at their rear ends, a propelling device arranged between said plow supporting members and a propulsion frame pivotally secured to the plow substantially abreast of the forward part of said propelling device and extending about and flexibly connected to the rear of said propelling device.

4. A snow removing apparatus comprising a self-supported plow including rearwardly extending spaced supporting members having bearing rollers at their rear ends, a propelling device arranged between said plow supporting members with the bulk of said propulsion device forward of said rollers, and a propulsion frame flexibly connected to the rear of said propelling device and extending forward on each side thereof for pivotal connection with said plow at points substantially abreast of the forward end of said propelling device.

5. A snow removing apparatus comprising a self-supported plow, a power driven propelling device, a propulsion frame connected to the plow and extending around and flexibly connected to the rear of said propelling device, and connections between the forward portion of said propelling device and said plow including a downwardly and forwardly inclined flexible resiliently connected link tending to exert a downward yielding pressure upon said propelling device.

6. A snow removing apparatus comprising a self-supported plow, a power driven propelling device, a propulsion frame connected to the plow and extending around and flexibly connected to the rear of said propelling device, and resilient connections between opposite forward portions of said propelling device and said plow including a downwardly and forwardly inclined link having universal connection with said plow.

7. A snow removing apparatus comprising a self-supported plow, a power driven propelling device having relatively movable traction members, a propulsion frame connected to the plow and extending around and flexibly connected to the rear of said propelling device, and universally flexible resilient connecting means between the forward portions of said traction members and said plow to exert a downward pressure upon said propelling device and compensate for said relative movement of said traction members.

8. A snow removing apparatus comprising a self-supported plow, a power driven propelling device, a propulsion frame connected to the plow and extending around and flexibly connected to the rear of said propelling device, and means pivotally connected with said propelling device and universally pivoted to said plow at a point forward of and below its point of connection with said propelling device adapted to exert a forward and downward pressure upon said propelling device.

9. A snow removing apparatus comprising, in combination, a self-supported plow, propelling means for said plow consisting of a tractor having track laying structures pivotally arranged at opposite sides of the tractor frame, and a universal yielding connection between the forward end of each of said track laying structures and said plow for exerting a yielding downward pressure upon said track laying structures.

10. A snow removing apparatus comprising, in combination, a self-supported plow, propelling means for said plow consisting of a tractor having track laying structures pivotally arranged at opposite sides of the tractor frame, and a flexible link pivotally connected with the forward end of each track laying structure and having universal resilient connection with said plow at a point forward of and below the point of connection with said track laying structure, for exerting a depressing action upon the forward end of said tractor and for compensating for variations in movement between said track laying structures.

11. A snow removing apparatus comprising a self-supported plow including rearwardly extending spaced supporting members, bearing members for said supporting members, a propelling device, a propulsion frame pivotally connected to opposite sides of the plow and extending around and flexibly connected to the rear of said propelling device, and cooperating wearing devices between said propulsion frame and the rear portions of said supporting members.

12. A snow removing apparatus comprising a self-supported plow including rearwardly extending spaced supporting members, bearing members for said supporting members, a propelling device, a propulsion frame pivotally connected to opposite sides of the plow and extending around and flexibly connected to the rear of said propelling device, and cooperating wearing devices between said propulsion frame and the rear portions of said supporting members and between said supporting members and said propelling device.

13. In a snow removing apparatus, in combination, a plow having an elongated supporting base, a propelling device and a propulsion frame extending around said propelling device operatively connected to the rear of said propelling device and pivotally connected forwardly of said propelling device at spaced points to said plow supporting base and at points substantially abreast of the forward end of said propelling device.

14. In a snow removing apparatus, in combination, a plow having rearwardly extending spaced rigid supporting members providing an elongated supporting base for stabilizing the plow, a propelling device arranged between said supporting members and a propulsion frame pivotally connected near the forward portion of each of said spaced supporting members substantially in alignment with the forward end of said propelling device and flexibly connected to the rear of said propelling device.

In testimony whereof, I have signed my name to this specification.

FREDERICK O. SNOW, Jr.